United States Patent
Okumura (10) Patent No.: US 11,455,135 B2
(45) Date of Patent: Sep. 27, 2022

(54) IMAGE FORMING SYSTEM, IMAGE FORMING APPARATUS, MOBILE TERMINAL DEVICE, AND COMPUTER-READABLE NON-TRANSITORY RECORDING MEDIUM

(71) Applicant: KYOCERA Document Solutions Inc., Osaka (JP)

(72) Inventor: Ryuichi Okumura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/175,765

(22) Filed: Feb. 15, 2021

(65) Prior Publication Data
US 2021/0271439 A1    Sep. 2, 2021

(30) Foreign Application Priority Data

Feb. 27, 2020    (JP) .............................. JP2020-031233

(51) Int. Cl.
*G06F 3/12* (2006.01)

(52) U.S. Cl.
CPC .......... *G06F 3/1256* (2013.01); *G06F 3/1204* (2013.01); *G06F 3/1208* (2013.01); *G06F 3/1292* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,958,987 B1* | 3/2021 | Hegar | ............... | H04N 21/6581 |
| 11,223,831 B2* | 1/2022 | Noraz | .................. | H04N 19/134 |
| 2007/0223068 A1* | 9/2007 | Ishii | .................... | H04N 1/00278 |
| | | | | 358/527 |
| 2008/0013849 A1* | 1/2008 | Chouly | ................ | H04N 19/117 |
| | | | | 375/E7.176 |
| 2008/0247655 A1* | 10/2008 | Yano | ...................... | H04N 19/63 |
| | | | | 382/232 |
| 2010/0110492 A1* | 5/2010 | Matsuhira | ............ | H04N 1/3877 |
| | | | | 358/1.15 |
| 2010/0158410 A1* | 6/2010 | Kusakabe | ................. | G06T 1/00 |
| | | | | 345/428 |
| 2012/0067943 A1* | 3/2012 | Saunders | ............. | G06K 7/1434 |
| | | | | 235/462.11 |
| 2014/0084067 A1* | 3/2014 | Vanderhulst | ......... | H04B 10/116 |
| | | | | 235/494 |
| 2015/0015909 A1* | 1/2015 | Kaida | ................... | G06F 21/608 |
| | | | | 358/1.14 |

(Continued)

FOREIGN PATENT DOCUMENTS

JP    H9-37096    2/1997

*Primary Examiner* — Helen Zong
(74) *Attorney, Agent, or Firm* — Lex IP Meister, PLLC (57) ABSTRACT

The image forming apparatus includes a display device, (a) generates a preview image corresponding to a target image to be printed, (b) generates an encoded image by encoding the preview image, and (c) displays the encoded image on the display device without displaying the preview image. The mobile terminal device (a) optically captures an encoded image displayed on the image forming device, (b) acquires a preview image by decoding the captured encoded image, and (c) displays the acquired preview image.

9 Claims, 6 Drawing Sheets

(56) References Cited

U.S. PATENT DOCUMENTS

| | | | |
|---|---|---|---|
| 2015/0098096 A1* | 4/2015 | Hashimoto | G06F 3/1242 358/1.6 |
| 2016/0021342 A1* | 1/2016 | Aso | H04N 5/23212 702/150 |
| 2016/0191494 A1* | 6/2016 | Claes | G06F 21/31 713/159 |
| 2018/0204060 A1* | 7/2018 | Merchant | G06K 7/1417 |
| 2018/0239939 A1* | 8/2018 | Tyagi | G06K 7/1417 |
| 2019/0354956 A1* | 11/2019 | Lee | G06Q 20/321 |
| 2019/0361649 A1* | 11/2019 | Hori | G06F 3/1205 |
| 2020/0034674 A1* | 1/2020 | Hayashi | G06F 3/1215 |
| 2020/0396381 A1* | 12/2020 | Ihara | H04N 5/23229 |
| 2021/0092373 A1* | 3/2021 | Fulghum | H04L 65/601 |

* cited by examiner

IMAGE FORMING SYSTEM, IMAGE FORMING APPARATUS, MOBILE TERMINAL DEVICE, AND COMPUTER-READABLE NON-TRANSITORY RECORDING MEDIUM

INCORPORATION BY REFERENCE

This application is based upon and claims the benefit of priority from Japanese Patent Application No. 2020-031233, filed on Feb. 27, 2020, the entire contents of which are incorporated herein by reference.

The present disclosure relates to an image forming system, an image forming apparatus, a mobile terminal device, and a preview support program.

BACKGROUND

An image processing device includes a printing device and a display device, and can perform preview processing for displaying a preview image corresponding to a target image to be printed by the printing device, on the display device.

However, in the image processing apparatus, since the preview image is displayed on the display device fixed to the apparatus in the preview processing, there is a possibility that the preview image is viewed by someone other than the user, and information (confidential information, etc.) of the preview image (for example, the target image) is leaked.

SUMMARY

An image forming system according to the present disclosure includes a mobile terminal device and an image forming apparatus. The image forming apparatus comprises a display device, the image forming apparatus (a) generates a preview image corresponding to a target image to be printed, (b) generates an encoded image by encoding the preview image, and (c) displays the encoded image on the display device without displaying the preview image, and the mobile terminal device (a) optically captures the encoded image displayed on the image forming apparatus, (b) acquires the preview image by decoding the captured encoded image, and (c) displays the acquired preview image.

An image forming apparatus according to the present disclosure comprises a display device, and a preview processing unit which (a) generates a preview image corresponding to a target image to be printed, (b) generates an encoded image by encoding the preview image, and (c) displays the encoded image on the display device without displaying the preview image.

A mobile terminal device according to the present disclosure includes an image capturing device, a display device, and a preview support unit which (a) optically captures an encoded image displayed on the image forming apparatus using the image capturing device, (b) acquires a preview image generated by the image forming apparatus by decoding the captured encoded image, and (c) displays the acquired preview image on the display device.

A preview support program according to the present disclosure causes a computer in the mobile terminal device provided with the image capturing device and the display device to function as the preview support unit described above.

The objects, features, and advantages of the present disclosure will become more apparent from the following detailed description, in which reference is made to the accompanying drawings, in which preferred embodiments of the present disclosure are illustrated.

DETAILED DESCRIPTION

First Embodiment

Figure 1:
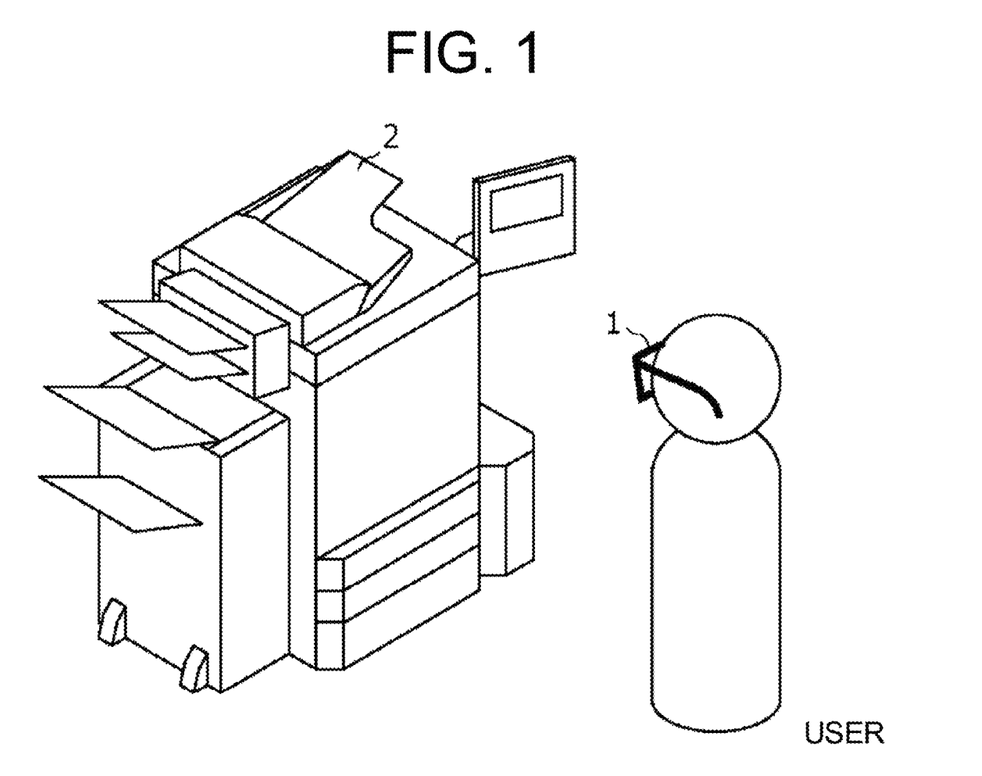
FIG. 1 is a diagram showing a configuration of an image forming system according to an embodiment of the present disclosure.

A first embodiment of the present disclosure will be described below with reference to the drawings. FIG. 1 is a diagram showing a configuration of an image forming system according to an embodiment of the present disclosure. The system shown in FIG. 1 includes a mobile terminal device 1 and an image forming apparatus 2. The mobile terminal device 1 is a wearable terminal device such as an MR (Mixed Reality) glass or a portable terminal device such as a smartphone, which is attached to or carried by a user who uses the image forming apparatus 2, and has an image capturing function and an image display function.

Figure 2:
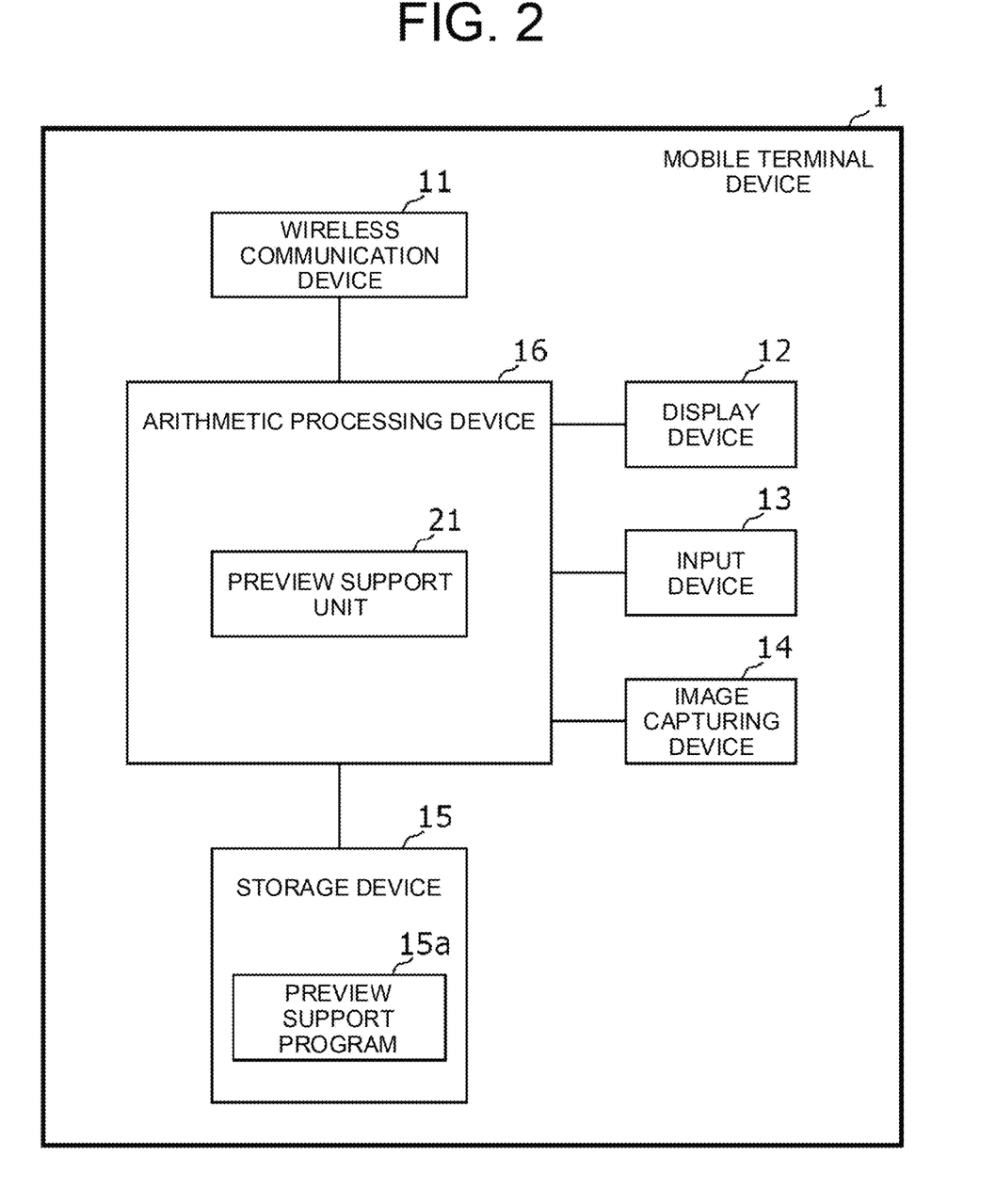
FIG. 2 is a block diagram showing the configuration of the mobile terminal device 1 shown in FIG. 1.

FIG. 2 is a block diagram showing the configuration of the mobile terminal device 1 shown in FIG. 1. The mobile terminal device 1 shown in FIG. 2 includes a wireless communication device 11, a display device 12, an input device 13, an image capturing device 14, a storage device 15, and an arithmetic processing device 16.

The wireless communication device 11 is a communication circuit of a predetermined wireless communication standard. For example, the wireless communication device 11 is a communication circuit of short distance wireless communication such as Bluetooth (registered trademark) or a wireless LAN interface.

The display device 12 is a device such as a liquid crystal display, which is arranged in the mobile terminal device 1, and displays various screens to the user. When the mobile terminal device 1 is an MR glass, a transmission type display or a retinal display such as a retinal projection type display or a retinal scanning type display is used as the display device 12.

The input device 13 is a device such as a touch panel or a hard key arranged on the display device 12 and detects a user operation.

The image capturing device 14 is provided with an image sensor, captures an object in the field of view (here, an image displayed on the operation panel of the image forming apparatus 2), and generates image data of the captured image.

The storage device 15 is a nonvolatile storage device such as a flash memory, and stores programs and data. The storage device 15 stores a preview support program 15a as an application program.

The arithmetic processing device 16 is a computer having a CPU (Central Processing Unit), a ROM (Read Only Memory), a RAM (Random Access Memory), and the like, and operates as various processing units by loading and executing programs from the storage device 15 or the ROM into the RAM.

In this embodiment, the arithmetic processing device 16 operates as a preview support unit 21 by executing the preview support program 15*a*.

The preview support unit 21 (*a*) optically captures an encoded image (described later) displayed on the image forming apparatus 2, (b) obtains a preview image by decoding the captured encoded image, and (c) displays the obtained preview image to the user on the display device 12.

Figure 3:
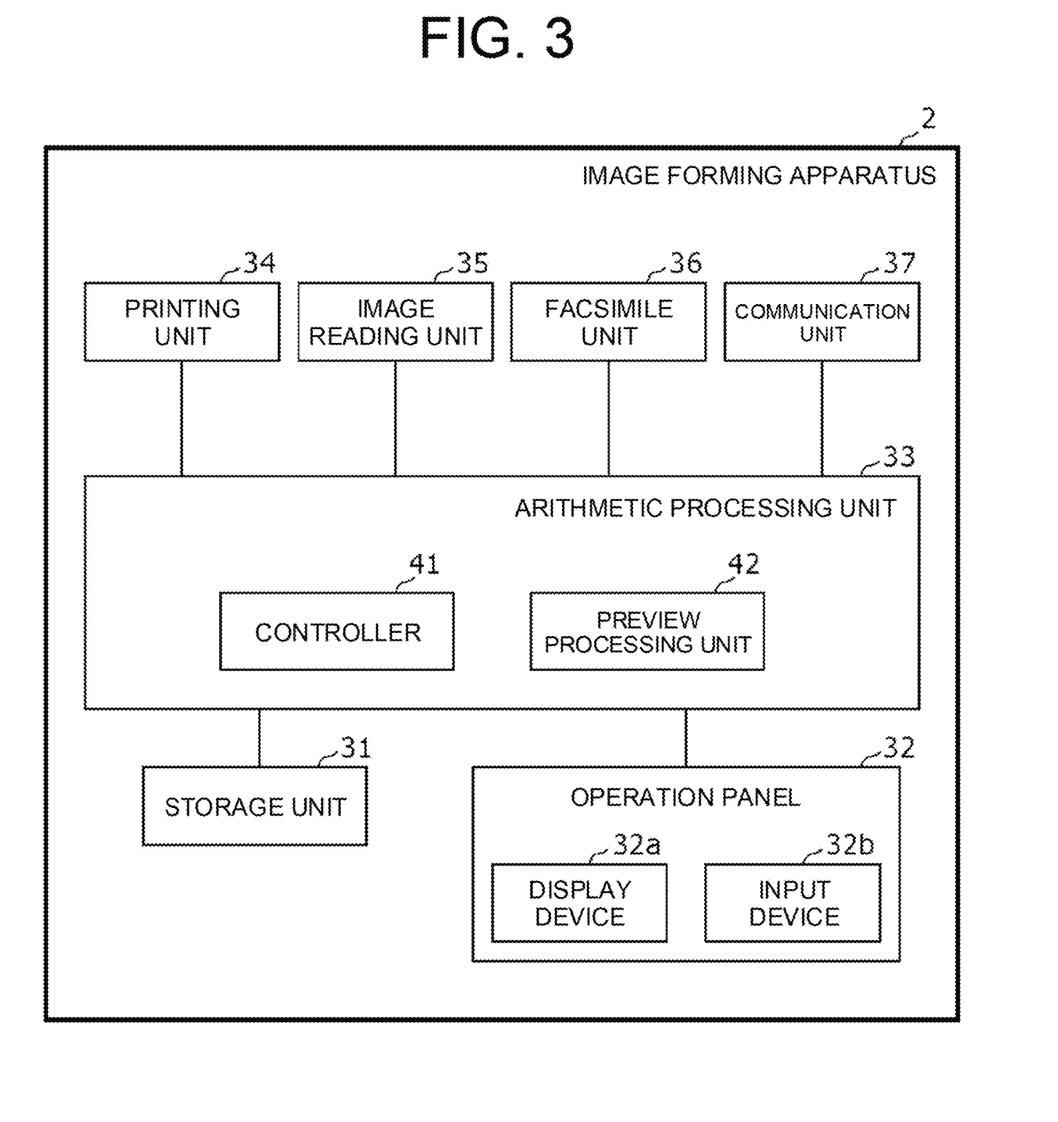
FIG. 3 is a block diagram showing the configuration of the image forming apparatus 2 shown in FIG. 1.

FIG. 3 is a block diagram showing the configuration of the image forming apparatus 2 shown in FIG. 1. The image forming apparatus 2 shown in FIG. 3 includes a storage unit 31, an operation panel 32, an arithmetic processing unit 33, a printing unit 34, an image reading unit 35, a facsimile unit 36, a communication unit 37, and the like.

The storage unit 31 is a nonvolatile rewritable storage device such as a flash memory.

The operation panel 32 is disposed on the front side of the upper surface of main body of the image forming apparatus 2 and includes a display device 32*a* such as a liquid crystal display and an input device 32*b* such as a touch panel. The display device 32*a* displays various screens to the user, and the input device 32*b* accepts user operations input by the user.

The arithmetic processing unit 33 is a computer having a CPU, a ROM, and a RAM, and operates as various processing units by loading a program stored in the ROM or a storage device (not shown) into the RAM and executing the program by the CPU. The arithmetic processing unit 33 operates as a controller 41 and a preview processing unit 42.

The printing unit 34 prints a target image (document image or the like) on a print sheet based on the image data. The image reading unit 35 optically reads a document image from a document and generates image data of the document image. The facsimile unit 36 generates and transmits a facsimile signal such as a document image based on the image data, receives a facsimile signal from the outside, and generates image data from the facsimile signal. The communication unit 37 is a communication device capable of data communication with the wireless communication device 11 of the mobile terminal device 1.

The controller 41 controls internal apparatuses such as the printing unit 34, the image reading unit 35, the facsimile unit 36, and the communication unit 37 to execute various processes (such as printing of a target image) and predetermined image processing necessary for the processes.

The preview processing unit 42 (*a*) generates a preview image corresponding to the target image to be printed by performing predetermined image processing (such as conversion to a color mode or a color tone according to the print setting) on the target image to be printed, (b) generates an encoded image by encoding the preview image in a predetermined encoding method, and (c) displays the encoded image on the display device 32*a* without displaying the preview image.

In this embodiment, the preview processing unit 42 generates a plurality of encoded divided images by (b1) dividing the preview image into a plurality of divided images, (b2) respectively encoding the plurality of divided images, and (b3) arranging the plurality of encoded divided images, in accordance with a predetermined conversion rule.

In this embodiment, each unit area (for example, 8×8 pixels) of the divided image is converted into DCT coefficients (i.e., spatial frequency components) in number equal to the number of pixels in the unit area by the Discrete Cosine Transform, and an encoded divided image having pixel values corresponding to the DCT coefficients is generated based on the DCT coefficients. The DCT coefficients are integers within a predetermined range.

The conversion rule specifies, for example, the number of divided images corresponding to one preview image, the size of the divided image (the number of pixels in the vertical and horizontal directions), the order of the encoded divided images (the order of arrangement here), the order of arrangement of the DCT coefficients in the encoded divided images, and the like. The order of the encoded divided images is changed with respect to the arrangement order of the divided images, for example, randomly or in accordance with a predetermined rule. The order of the encoded divided images may be fixed or changed every time the encoded divided image is generated. Similarly, the arrangement order of the DCT coefficients may be fixed or may be changed every time the encoded divided image is generated."

Therefore, in this embodiment, the preview support unit 21 of the mobile terminal device 1 (b1) divides the captured encoded image into a plurality of encoded divided images, (b2) generates a plurality of divided images by decoding each of the plurality of encoded divided images obtained from the captured encoded image, and (b3) acquires a preview image by arranging the generated divided images, according to the conversion rule.

In this embodiment, the preview processing unit 42 of the image forming apparatus 2 notifies the mobile terminal device 1 of the conversion rule by using the communication unit 37, and the preview support unit 21 of the mobile terminal device 1 receives the notification by the wireless communication device 11 and performs the above-described processing according to the notified conversion rule.

Further, in this embodiment, at that time, the preview processing unit 42 notifies the mobile terminal device 1 of the conversion rule by encrypted communication based on the encryption key unique to the mobile terminal device 1. The encrypted communication may be a common key encryption method or a public key encryption method. When the common key encryption method is used for the encrypted communication, the common key may be carried by the public key encryption method between the image forming apparatus and the mobile terminal device 1. When the public key encryption method is used for the encrypted communication and when the common key encryption method is used for the encryption communication and the common key is conveyed by the public key encryption method, for example, the mobile terminal device 1 first transmits its own public key to the image forming apparatus 2 by the wireless communication device 11."

Figure 4:
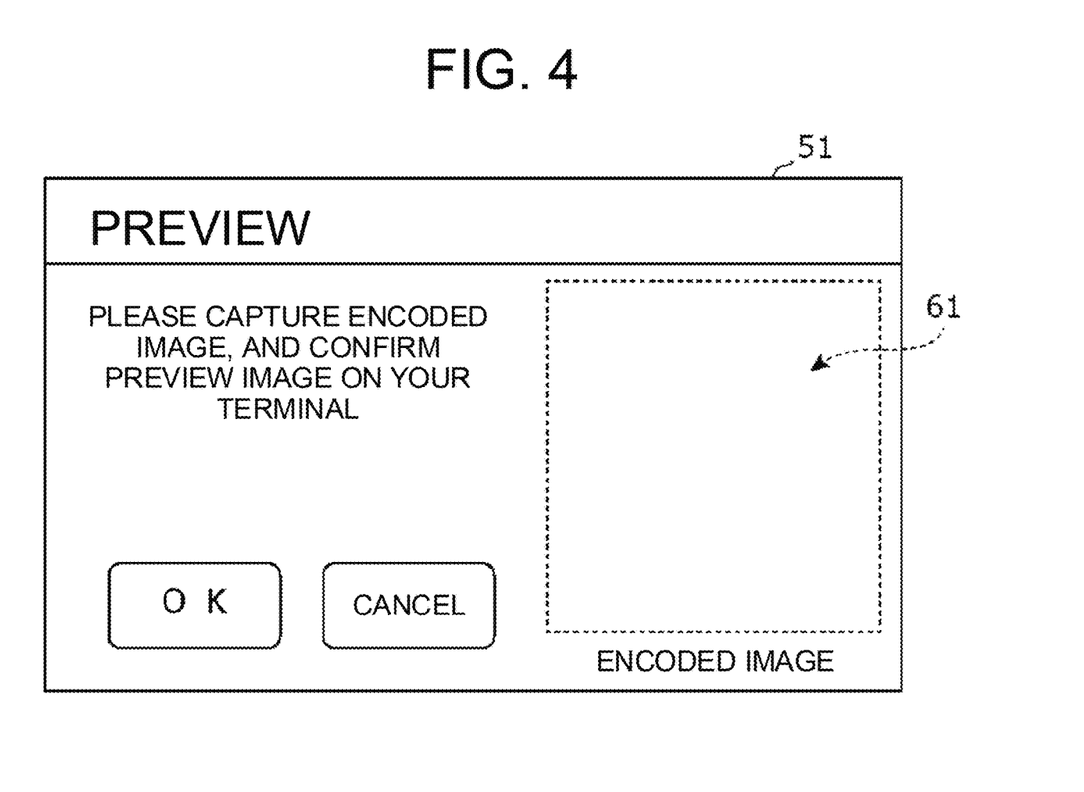
FIG. 4 is a view showing an example of a preview processing screen displayed on the image forming apparatus 2 in FIG. 1.
Figure 5:
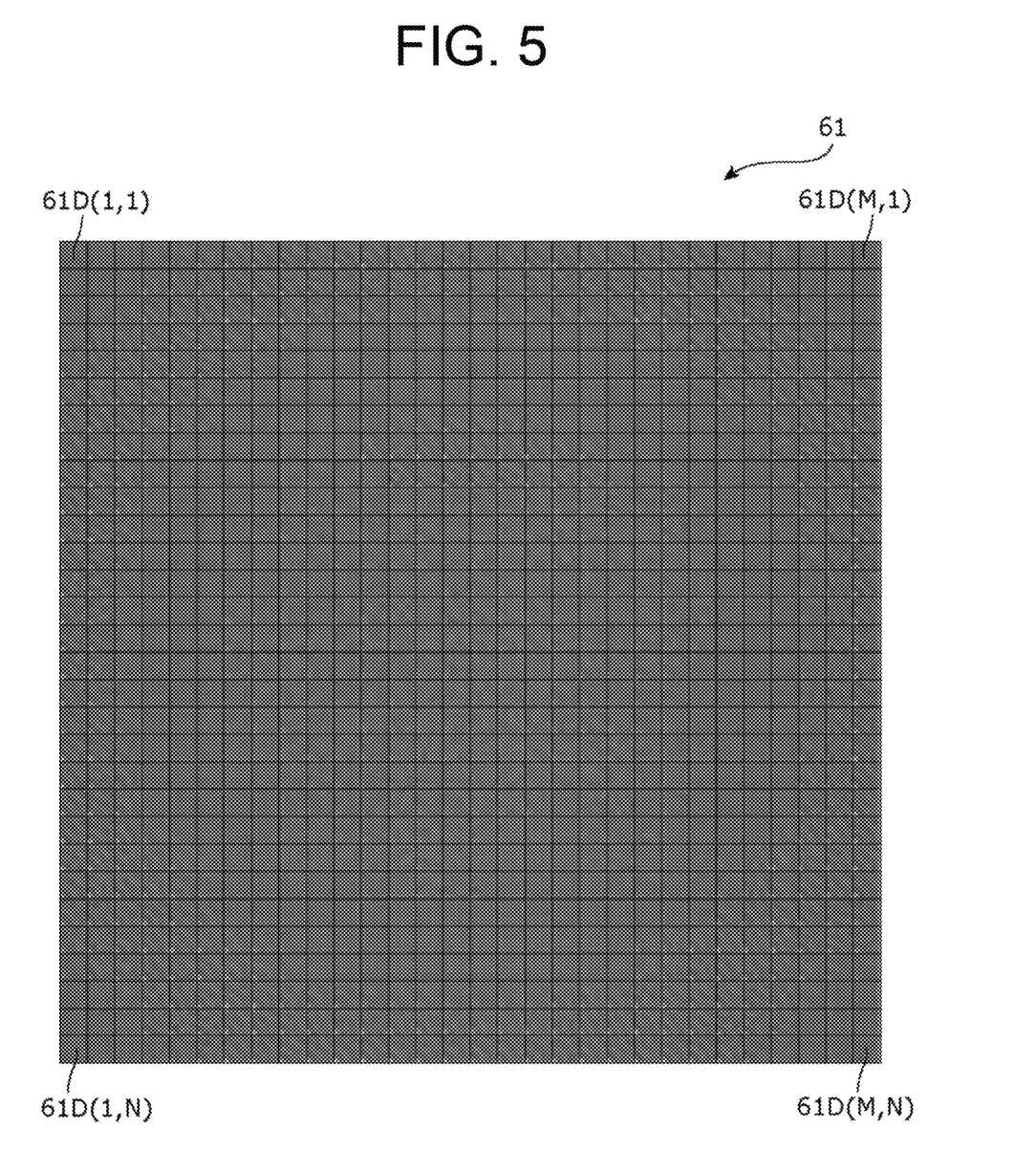
FIG. 5 is a diagram showing an example of an encoded image displayed on a preview processing screen as shown in FIG. 4, for example.

FIG. 4 is a view showing an example of a preview processing screen displayed on the image forming apparatus 2 in FIG. 1. FIG. 5 is a diagram showing an example of an encoded image displayed on the preview processing screen as shown in FIG. 4, for example.

In the image forming apparatus 2, for example, an operation screen 51 as shown in FIG. 4 is displayed on the display device 32*a*. The operation screen 51 includes an encoded image 61. For example, as shown in FIG. 5, the encoded image 61 is a grayscale image. For example, as shown in FIG. 5, the encoded image 61 has a plurality of encoded divided images 61D (1, 1) to 61D (M, N) arranged in accordance with the conversion rule described above. For example, as shown in FIG. 5, a boundary line (solid line of maximum black density) may be inserted between two encoded divided images adjacent to each other, and in this case, the mobile terminal device 1 detects the boundary line in the captured encoded image, and the captured encoded image is divided into a plurality of encoded divided images by the boundary line.

As described above, in the image forming apparatus 2, since the encoded image 61 is displayed without the preview image being displayed, even if a person other than the user looks at the encoded image 61, the contents of the preview image (that is, the target image to be printed) cannot be known.

Further, even if a person other than the user can capture the encoded image 61 by a mobile terminal device similar to the mobile terminal device 1, since the conversion rule described above is transferred to the mobile terminal device 1 by encrypted communication unique to the mobile terminal device 1, other mobile terminal devices cannot acquire the conversion rule, and it is difficult to restore the original preview image from the encoded image 61.

Figure 6:
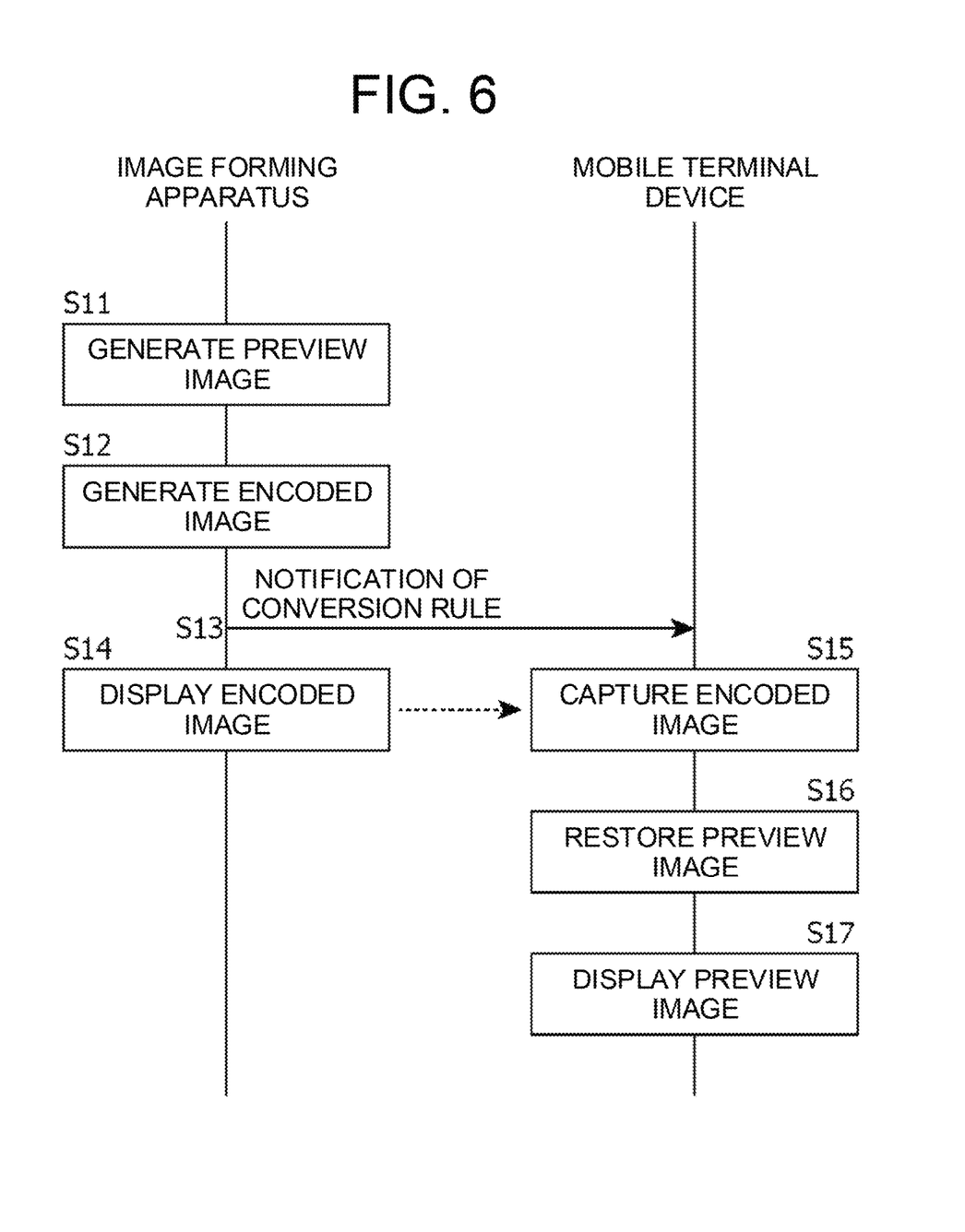
FIG. 6 is a sequence diagram for explaining the operation of the image forming system shown in FIG. 1.

Next, the operation of the image forming system will be described. FIG. 6 is a sequence diagram for explaining the operation of the image forming system shown in FIG. 1.

When the controller 41 of the image forming apparatus 2 receives a job request such as a print job or a copy job, the controller 41 executes the corresponding job. At this time, when the preview processing of the image to be printed is required, the controller 41 causes the preview processing unit 42 to execute the preview processing.

First, the preview processing unit 42 generates a preview image corresponding to the current print setting (step S11). Next, the preview processing unit 42 sets a conversion rule and generates an encoded image corresponding to the preview image in accordance with the conversion rule (step S12). Then, the preview processing unit 42 transmits a notification of the conversion rule to the mobile terminal device 1 by wireless communication (step S13), and displays the encoded image on the display device 32a (step S14).

On the other hand, when the user confirms that the encoded image is displayed on the image forming apparatus 2 (the display device 32a), the user performs a capturing operation on the mobile terminal device 1.

In the mobile terminal device 1, the preview support unit 21 receives the notification of the conversion rule, and the image capturing device 14 captures the encoded image in accordance with the capturing operation (step S15). Specifically, the preview support unit 21 extracts an encoded image from a captured image obtained by the image capturing device 14 by using an existing image recognition method. Then, the preview support unit 21 restores the preview image from the encoded image in accordance with the received conversion rule (step S16), and displays it on the display device 12 (step S17).

Thereafter, the user confirms the preview image on the display device 12 of the mobile terminal device 1, and if there is no problem with the preview image, the user performs an operation (for example, pressing the OK key on the operation screen as shown in FIG. 4) to the image forming apparatus 2 (the input device 32b), and when the controller 41 of the image forming apparatus 2 detects the operation by the input device 32b, the controller 41 causes the printing unit 34 to print the target image in the current print setting.

As described above, according to the first embodiment, the image forming apparatus 2 includes a display device 32a, (a) generates a preview image corresponding to the target image to be printed, (b) generates an encoded image by encoding the preview image, and (c) displays the encoded image on the display device 32a without displaying the preview image. The mobile terminal device 1 (a) optically captures the encoded image displayed on the image forming apparatus 2, (b) acquires the preview image by decoding the captured encoded image, and (c) displays the acquired preview image.

As a result, in the preview process, the preview image is not displayed in the image forming apparatus 2, and the preview image is displayed in the user's mobile terminal device 1, so that it is difficult for others to see the preview image, and information leakage attributed to the preview process is prevented.

It is also conceivable to transfer the image data of the preview image by wireless communication such as Bluetooth (registered trademark), but this is not practical because the data size is large and the transfer time is long. For example, in the case where a target image (7016×4961 pixels) of A4 size and 600 dpi is expressed by 8-bit RGB data, when image data of a preview image whose horizontal and vertical sizes are reduced to 25% is compressed to 10% by the JPEG method to generate encoded image data, and the encoded image data is transferred by wireless communication at a transfer speed of 100 kbps, the transfer time becomes about 50 seconds, and the waiting time becomes long, and thus the power consumption of the battery-driven mobile terminal device becomes large. For example, Bluetooth Low Energy is used for the above-described wireless communication. Although the theoretical maximum transfer speed of Bluetooth Low Energy is 1 Mbps, the actual transfer speed may be 10 to 100 kbps in some cases. It is also possible to convert the preview image to a data size that can be transferred by wireless communication such as Bluetooth (registered trademark), but in this case, the preview image to be displayed becomes too small or too deteriorated, so that it becomes difficult for the user to judge the quality of the present print setting from the preview image to be displayed.

Second Embodiment

In the image forming system according to the second embodiment, the preview processing unit 42 of the image forming apparatus 2, in accordance with the above conversion rule, (b1) divides the preview image into a plurality of divided images, (b2) generates a plurality of encoded divided images by encoding each of the plurality of divided images, and (b3) displays the plurality of encoded divided images in a predetermined number (for example, such as one fourth, one ninth, one sixteenth, and one twenty-fifth of the number of encoded divided images, or one image in some cases) on the display device 32a. In the second embodiment, the preview support unit 21 of the mobile terminal device 1 (b1) sequentially captures the predetermined number of encoded divided images in the plurality of encoded divided images, (b2) generates the plurality of divided images by respectively decoding the captured plurality of encoded divided images in accordance with the conversion rule, and (b3) acquires the preview images by arranging the generated plurality of divided images.

The predetermined number is also described in the conversion rule. The preview support unit 21 of the mobile terminal device 1 may transmit a capturing completion notice to the image forming apparatus 2 by the above-described wireless communication every time one time of capturing of the encoded divided image is completed, and the preview processing unit 42 of the image forming apparatus 2 may switch the display of the predetermined number of encoded divided images and display the next predetermined number of encoded divided images when receiving the capturing completion notice.

Since other configurations and operations of the image forming system according to the second embodiment are the same as those of the first embodiment, description thereof will be omitted.

Third Embodiment

In the image forming system according to the third embodiment, the preview support unit 21 of the mobile terminal device 1 may transmit a request to increase the display size of the encoded image to the image forming apparatus 2 when the size of the captured encoded image is less than the predetermined threshold or when the size of the generated divided image is less than the predetermined threshold, and the preview processing unit 42 of the image forming apparatus 2 may increase the display size of the encoded image when receiving the request from the mobile terminal device 1.

When a predetermined number of encoded divided images are displayed as in the second embodiment, the preview processing unit 42 may change the predetermined number (that is, the number of the encoded divided images displayed in one display of the encoded divided images) according to the display size of the encoded image.

Other configurations and operations of the image forming system according to the third embodiment are the same as those of the first embodiment or the second embodiment, and therefore the description thereof will be omitted.

Various changes and modifications to the embodiments described above will be apparent to those skilled in the art. Such changes and modifications may be made without departing from the spirit and scope of the subject matter and without diminishing its intended advantages. That is, such changes and modifications are intended to be included in the claims.

For example, in the first to third embodiments, the image forming apparatus 2 sets the brightness or contrast level of the display device 32a based on a predetermined set value (a default system set value or a user set value), and the preview processing unit 42 may increase the brightness level or contrast of the display device 32a from the first level corresponding to the set value to a predetermined second level higher than the first level when displaying the encoded image. In this way, the dynamic range of the display density in the display device 32a is widened, and the encoded image can be easily captured appropriately by the mobile terminal device 1.

In the first to third embodiments, the mobile terminal device 1 (the preview support unit 21) may execute a predetermined warning process for the user (for example, display of a message prompting the user to take a larger image of the encoded image) when the size of the captured encoded image is less than the predetermined threshold or when the size of the generated divided image is less than the predetermined threshold. When the encoded image is re-captured in accordance with the user operation after the warning processing, the mobile terminal device 1 executes the above processing based on the encoded image.

In the first to third embodiments, the conversion rule may be fixed and may be implemented in advance in the image forming apparatus 2 and the mobile terminal device 1, or may be changed for each (that is, one) preview process.

Further, in the first to third embodiments, the notification timing of the conversion rule may be after the start of the display of the encoded image or after the completion of the capturing of the encoded image from the mobile terminal device 1 to the image forming apparatus 2.

It should be noted that the description of the above-described embodiment shows an aspect of the image forming apparatus according to the present disclosure, and the technical scope of the present disclosure is not limited to the above-described embodiment. The present disclosure may be variously changed, substituted, or modified without departing from the spirit of the technical idea, and the claims include all embodiments that can be included within the scope of the technical idea.

What is claimed is:

1. An image forming system comprising:
a mobile terminal device; and
an image forming apparatus, wherein
the image forming apparatus includes a display device, (a) generates a preview image corresponding to a target image to be printed, (b) generates an encoded image by encoding the preview image, and (c) displays the encoded image on the display device without displaying the preview image, and the mobile terminal device (a) optically captures the encoded image displayed on the image forming apparatus, (b) acquires the preview image by decoding the captured encoded image, and (c) displays the acquired preview image, and wherein
the image forming apparatus, in accordance with a predetermined conversion rule, (b1) divides the preview image into a plurality of divided images, (b2) generates a plurality of encoded divided images by encoding each of the plurality of divided images, and (b3) generates the encoded image by arranging the plurality of encoded divided images, and the mobile terminal device, in accordance with the conversion rule, (b1) divides the captured encoded image into a plurality of encoded divided images, (b2) generates a plurality of divided images by decoding each of the plurality of encoded divided images obtained from the captured encoded image, and (b3) acquires the preview image by arranging the generated plurality of divided images.

2. The image forming system according to claim 1, wherein the image forming apparatus notifies the mobile terminal device of the conversion rule.

3. The image forming system according to claim 2, wherein the image forming apparatus notifies the mobile terminal device of the conversion rule by encrypted communication based on an encryption key unique to the mobile terminal device.

4. The image forming system according to claim 1, wherein
the image forming apparatus sets a level of brightness or contrast of the display device based on a predetermined set value, and increases the brightness level or contrast of the display device from a first level corresponding to the set value to a predetermined second level higher than the first level when displaying the encoded image.

5. The image forming system according to claim 1, wherein
the mobile terminal device transmits a request to increase a display size of the encoded image to the image forming apparatus when a size of the captured encoded image is less than a predetermined threshold or when a size of the generated divided image is less than a predetermined threshold, and the image forming apparatus increases the display size of the encoded image upon receiving the request from the mobile terminal device.

6. The image forming system according to claim 1, wherein
the image forming apparatus, according to a predetermined conversion rule, (b1) divides the preview image into a plurality of divided images, (b2) generates a plurality of encoded divided images by encoding each of the plurality of divided images, and (b3) sequentially displays a predetermined number of the plurality of encoded divided images on the display device, and
the mobile terminal device (b1) sequentially captures the predetermined number of the encoded divided images in the plurality of encoded divided images, (b2) generates the plurality of divided images by decoding each of the plurality of encoded divided images captured, according to the conversion rule; and (b3) acquires the preview image by arranging the plurality of generated divided images.

7. An image forming apparatus comprising:
a display device; and
a preview processing unit to (a) generate a preview image corresponding to a target image to be printed, (b) generate an encoded image by encoding the preview image, and (c) display the encoded image on the display device without displaying the preview image, wherein
the preview processing unit, in accordance with a predetermined conversion rule, (b1) divides the preview image into a plurality of divided images, (b2) generates a plurality of encoded divided images by encoding each of the plurality of divided images, and (b3) generates the encoded image by arranging the plurality of encoded divided images.

8. A mobile terminal device comprising:
an image capturing device;
a display device; and
a preview support unit that (a) optically captures an encoded image displayed on an image forming apparatus by using the image capturing device, (b) acquires a preview image generated by the image forming apparatus by decoding the captured encoded image, and (c) displays the acquired preview image on the display device, wherein
the encoded image is generated, in accordance with a predetermined conversion rule, (b1) by dividing the preview image into a plurality of divided images, (b2) generating a plurality of encoded divided images by encoding each of the plurality of divided images, and (b3) arranging the plurality of encoded divided images, and the preview support unit, in accordance with the conversion rule, (b1) divides the captured encoded image into a plurality of encoded divided images, (b2) generates a plurality of divided images by decoding each of the plurality of encoded divided images obtained from the captured encoded image, and (b3) acquires the preview image by arranging the generated plurality of divided images.

9. A computer-readable non-transitory recording medium storing a preview support program which causes a computer in a mobile terminal device provided with an image capturing device and a display device to function as a preview support unit that (a) optically captures an encoded image displayed on an image forming apparatus by using the image capturing device, (b) acquires a preview image generated by the image forming apparatus by decoding the captured encoded image, and (c) displays the acquired preview image on the display device, wherein
the encoded image is generated, in accordance with a predetermined conversion rule, (b1) by dividing the preview image into a plurality of divided images, (b2) generating a plurality of encoded divided images by encoding each of the plurality of divided images, and (b3) arranging the plurality of encoded divided images, and the preview support unit, in accordance with the conversion rule, (b1) divides the captured encoded image into a plurality of encoded divided images, (b2) generates a plurality of divided images by decoding each of the plurality of encoded divided images obtained from the captured encoded image, and (b3) acquires the preview image by arranging the generated plurality of divided images.

* * * * *